June 7, 1955  H H. WOLFE  2,710,018
BRINE VALVE CONSTRUCTION FOR WATER SOFTENING SYSTEMS
Filed Jan. 29, 1952
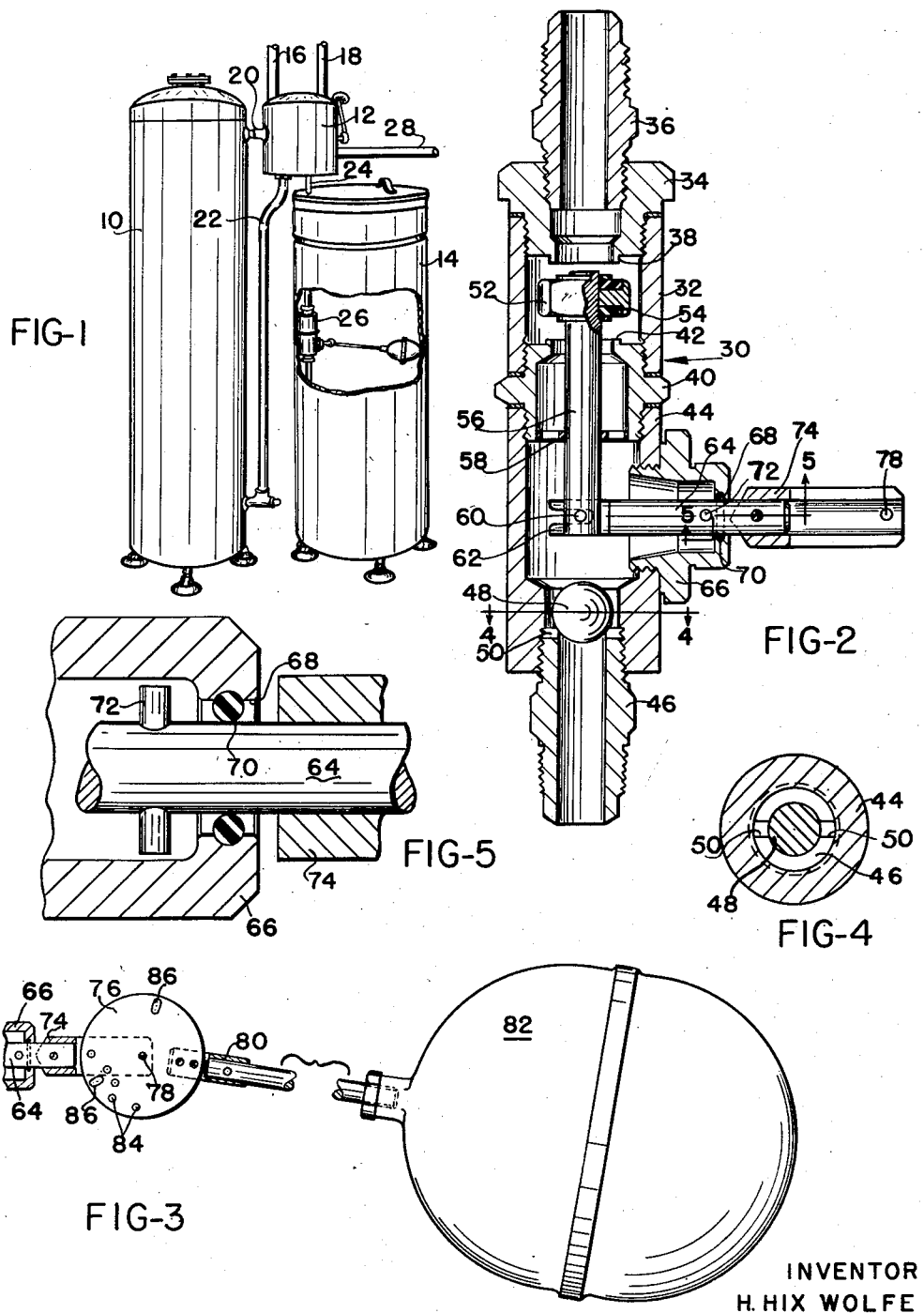
INVENTOR
H. HIX WOLFE
BY Toulmin & Toulmin
ATTORNEYS United States Patent Office 2,710,018
Patented June 7, 1955

2,710,018

BRINE VALVE CONSTRUCTION FOR WATER SOFTENING SYSTEMS

H Hix Wolfe, Dayton, Ohio, assignor to The Duro Co., Dayton, Ohio, a corporation of Ohio Application January 29, 1952, Serial No. 268,703

2 Claims. (Cl. 137—411)

This invention relates to valves, and particularly to the construction of a brine valve for a water softening system.

Water softening systems of the zeolite type are well known, and it is also well known that when a water softener of the zeolite type is regenerated, a brine solution is passed through the mineral within the softener. The valve of the present invention is particularly adapted for controlling the flow of brine during the regenerating operation of a water softener of this nature, and also for controlling the supply of water to the brine tank for refilling the brine tank after the brine has been drawn therefrom during a regenerating operation of the softener.

During the regenerating cycle of a water softener of the nature referred to, it is important that sufficient brine be supplied thereto, but that no over-supply of brine be passed through the softener which would represent a wasting of the brine solution. Accordingly, one of the primary objects of the present invention is the provision of a valve for being associated with the brine supply to a water softener which will control the amount of brine to the brine tank.

A still further object of the present invention is the provision of a brine control valve of the nature referred to which can be adjusted in order to accommodate different sizes of brine tanks.

A still further object of this invention is to provide an automatic brine control valve operable automatically to interrupt the flow of brine from a brine tank after a predetermined amount of the brine solution has been drawn therefrom.

A still further object of this invention is the provision, in a brine control valve, of an arrangement for controlling the amount of make-up water supplied to the brine tank after the brine has been drawn therefrom.

A still further particular object of this invention is the provision of an extremely simple and inexpensive brine control valve which will operate both to control the flow of brine solution from the tank and the supply of make-up or refill water thereto.

Another object of this invention is the provision of a brine and refill control valve for the brine tank for a water softening system adaptable to substantially any conventional softening system.

It is also an object of this invention to provide a new method of controlling the flow of brine solution from a brine tank and the supply of refill or makeup water thereto.

These and other objects and advantages will become more apparent upon reference to the following description taken in connection with the accompanying drawings, in which:

Figure 1 is a perspective view of a typical water softening system having a brine tank associated therewith and in which is mounted the brine valve of the present invention;

Figure 2 is a vertical section through the improved brine valve of the present invention;

Figure 3 is a view showing the float control arrangement for the brine valve;

Figure 4 is a section view indicated by line 4—4 of Figure 2, showing the restricted channels through which the refill water is supplied for the brine tank; and Figure 5 is a sectional view indicated by line 5—5 of Figure 2, showing the manner in which the operating member connected with the movable valve member of the valve is movably mounted in the valve body.

Referring to the drawings somewhat more in detail, Figure 1 illustrates a typical water softening installation wherein the softening tank containing the mineral is indicated at 10, the control valve by means of which the operation of the softener is controlled is indicated at 12, and the brine tank in which the brine solution is contained for regenerating the mineral, is indicated at 14.

Connected to valve 12 is a hard water supply conduit 16, and leading therefrom is the soft water conduit 18. The connection extends from control valve 12 to the top of tank 10, as indicated by the connection at 20, and a conduit 22 leads from valve 12 to the bottom of tank 10. There is also a brine supply conduit 24 extending from valve 12 into brine tank 14 and mounted in conduit 24 is the control valve 26 of the present invention.

According to practices well known in the water softening art, control valve 12 can be adjusted where the supply of water in conduit 16 passes through softening tank 10 and then to soft water conduit 18. The valve can be adjusted to backwash the reagent in tank 10, and at which time the water flows from conduit 16 through the mineral in tank 10 and is then discharged through the drain conduit 28.

Thereafter valve 12 is adjusted so that brine is supplied to brine tank 14 through the mineral in sufficient amount and for a sufficient time thoroughly to regenerate the mineral in the well-known manner. Thereafter, the supply of brine to tank 10 is interrupted and fresh water from conduit 16 flows through tank 10 and out the drain, thereby flushing all of the brine solution and residue from tank 10.

At the same time that tank 10 is being rinsed in the manner referred to above, or at a later time, there is a supply of fresh water from conduit 16 through conduit 24 into the brine tank 14 which supplies sufficient water to the brine tank to raise the level therein to that which obtained before the regeneration of the softener commenced.

The final stage in the regeneration cycle of the softener is the return of control valve 12 to the position where soft water is supplied to conduit 18 from tank 10.

A common manner of causing brine to flow from the brine tank to the softening tank is to build into control valve 10 a jet and venturi arrangement so that a suction is created in the space between the jet and venturi and which suction is communicated through conduit 24 with the brine tank so that brine is drawn from the tank and entrained in the jet of water entering the venturi and conveyed to tank 10 by the water.

For controlling the flow of brine, under the conditions referred to, and also for controlling the supply of refill water to conduit 24, I supply the brine control valve 26, and which is illustrated in detail in Figures 2, 4 and 5, and which has associated therewith a novel type float control illustrated in Figure 3. The valve, according to the present invention, comprises a valve body generally indicated at 30 and which may consist of an upper sleeve part 32 in the upper end of which is threaded a member 34 that in turn screw threadedly receives the fitting 36 adapted for receiving at its upper end the lower end of the previously mentioned conduit 24.

The lower end of member 34 is formed with an annular valve seat indicated at 38. The lower end of sleeve 32 is closed by a member 40 which has its upper end formed with the annular valve seat 42, corresponding in size and shape with the annular valve 38.

Member 40 is also threaded into the upper end of the lower part of the valve body, and which is indicated by reference numeral 44. At the extreme lower end of part 44, there is attached the fitting 46 adapted for receiving at its lower end an extension of conduit 24 leading to the bottom of brine tank 14. The upper end of member 46 within body part 44 is shaped to form an annular valve seat for receiving ball 48. The upper end of the said member, however, is transversely slotted, as at 50, so that when ball 48 is on its seat, it serves as a restrictor to control the rate of flow downwardly through the valve. However, the ball 48 is readily movable off its seat so that unrestricted fluid flow can take place upwardly through the valve.

Supported between valve seats 38 and 42 is a valve member 52 comprising the resilient annular rubber-like members 54 adapted for engagement with the said seats to form fluid-tight seals therewith. Valve member 52 is supported on the upper end of a rod 56 extending downwardly through member 40 and into part 44 of the valve body. There may be provided a guide washer 58 at the lower end of member 40 for guiding rod 56, and this washer is, of course, apertured so as not substantially to inhibit the flow of fluid through the valve body.

At its lower end, rod 56 is vertically slotted and carries the transverse pin 60, which is adapted for engagement with the fork-like end 62 of the operating rod 64 that extends transversely out the side of body part 44 of the valve. The opening through which rod 64 extends is closed by a member 66 having an aperture 68 in its wall for receiving rod 64. As will best be seen in Figure 5, aperture 68 includes a resilient annular rubber-like ring 70 that fits around rod 64 and forms a pivot means therefor so that the rod can tilt thereabout and cause the valve member 52 to move upwardly and downwardly within the valve body.

Rod 64 includes a transverse pin 72 extending therethrough immediately inside the end wall of member 66, and this prevents any substantial amount of movement of the said rod toward the right. Externally of member 66, rod 64 mounts and elements 74 which prevents any substantial amount of movement of the rod inwardly of the valve body and which also serves as a means for supporting the actuator for the valve member, as will be described in connection with Figure 3.

Turning now to Figure 3, taken in connection with Figure 2, it will be noted that the element 74 is slotted along its axis to receive therebetween a relatively thin plate 76. Plate 76 is pivoted to element 74 by a pin 78. Rigidly secured to plate 76 and extending outwardly therefrom on the side opposite element 74 is an arm 80 carrying at its outer end a float 82.

Plate 76 is provided with a plurality of apertures as indicated at 84, and these apertures are for the purpose of receiving stop pins 86, which may take the form of cotter keys, as indicated in Figure 3. Plate 76 is provided with a number of the said apertures so that the pins 86 can be located therein at various places in order to provide for a predetermined amount of lost motion between the float and float arm and the valve member of the valve. The importance of this will become more apparent in connection with the description of the operation of the valve.

It should be noted that the arrangement of the movable valve member within the valve body and the rod connected therewith, and of the actuating rod extending outwardly through the side of the valve body, and the float and float arm connected therewith, is such that when the float is floating on the surface of the brine solution in the brine tank, the valve member 52 and the rod 56 connected therewith, is substantially floatingly supported within the valve body and is readily movable in either direction until element 74 engages whichever one of pins 86 is most closely adjacent thereto. The importance of this feature is that float 82 can be employed as a primary control for the movement of the valve member in the valve body, but the said valve member is, nevertheless, movable independently of the float at least to a small degree.

*Operation*

Let it be assumed that the softening system is in service, and that the level of the brine in the brine tank is such that valve member 52 is closed on seat 42. The valve member 52, at this time, is held against seat 42 partly by water pressure standing on the upper face of valve 52, and partly by the float floating on the top of the brine.

When the valve 12 is now adjusted to that point in the regeneration cycle of the softener that a suction is drawn on conduit 24, this suction is sufficient to effect lifting of valve member 52 off its lower seat and to commence the flow of brine upwardly through the valve body and through conduit 24 to control valve 12. As this operation proceeds, the level of the brine solution in the brine tank will, of course, drop, and the float 82 will follow downwardly, and this will bring about upward movement of the valve member 52. As valve member 52 moves upwardly, due to the float falling with the brine level, it approaches and finally engages seat 38, thereby interrupting the flow of brine through conduit 24, and, thus, terminating the brining cycle of the softener.

Thereafter, when valve 12 is again shifted to its next position, water under pressure will be supplied to conduit 24, and this will act downwardly on the upper face of valve member 52 and force it away from seat 38, thus permitting a supply of water through the valve to the brine tank. During this supply of water to the brine tank, the rate of flow of the water is regulated by the notches 50 and ball 48, which at this time, is against its seat. After the level of the brine in the brine tank has risen to a predetermined level, valve member 52 is carried into engagement with its lower seat 42, and this interrupts the supply of water to the brine tank.

The plurality of apertures provided in plate 76 for receiving the pins 86 will readily accommodate the valve to different sizes of tanks and to different desired levels of brine within the tank so that the valve of the present invention can readily be adapted to substantially any situation involving a brine tank in connection with a water softening unit.

The valve is preferably manufactured of a material suitably resistant to corrosion by the brine and may comprise brass, stainless steel or the like. The parts of the valve are such that they can readily be machined at high speed in conventional machining set-ups, and, accordingly, the valve is quite inexpensive to make. The valve can also readily be dismantled at any time for cleaning, adjustment, or repair, and its use, therefore, minimizes service problems in connection with water softeners.

The control valve 12 referred to, forms no part of the present invention, although it is particularly adapted for use in connection with the brine valve of the present invention.

It will be understood that this invention is susceptible to modification in order to adapt it to different usages and conditions, and, accordingly, it is desired to comprehend such modifications within this invention as may fall within the scope of the appended claims.

I claim:

1. In a valve structure for a water softening system, a valve body having ports in its opposite ends and a flow passage connecting said ports, a pair of spaced annular valve seats in said flow passage arranged adjacent one end of said valve body, a valve member having resilient seat engaging surfaces thereon disposed between said valve seats, an elongated valve stem connected to said valve and disposed along the axis of said flow passage, an actuating member operatively connected to said valve stem and extending laterally through the side wall of said valve body and operable for moving the valve member into engagement with one or the other of said valve seats to interrupt said flow passage, a disk having apertures therein, said disk being pivotally mounted on the outer end of said actuating member, stop pin means carried by said disk and inserted in said apertures for predetermining a certain amount of lost motion between said disk and said actuating member, a rod connected with said disk, and a float secured to the outer end of said rod.

2. In a valve structure for a water softening system, a valve body having ports in its opposite ends and a flow passage connecting said ports, a pair of spaced annular valve seats in said flow passage arranged adjacent one end of said valve body, a valve member having resilient seat engaging surfaces thereon disposed between said seats, an elongated valve stem connected to the valve and extending along the axis of said flow passage, an actuating member operatively connected to said valve stem and extending laterally through the side wall of said valve body for moving the valve member into engagement with one or the other of said seats to interrupt the flow passage, a rotatable disk pivotally mounted on the outer end of said actuating member, apertures in said disk, stop pin means carried by said disk and inserted in said apertures for predetermining a certain amount of lost motion between said disk and said actuating member, a rod connected with said disk extending outwardly therefrom, a float secured to the outer end of said rod, a ball valve in said valve body arranged adjacent the opposite end of said valve body from said pair of valve seats, said ball valve comprising a valve seat having notched portions therein for supporting the ball valve member to provide for restricted flow of fluid through the valve in one direction while permitting free flow therethrough in the opposite direction.

References Cited in the file of this patent

UNITED STATES PATENTS

| | | |
|---|---|---|
| 434,211 | Sumner | Aug. 12, 1890 |
| 1,576,855 | Serres | Mar. 16, 1926 |
| 1,851,927 | McCord | Mar. 29, 1932 |
| 1,889,231 | Wahlbom et al. | Nov. 29, 1932 |
| 2,541,622 | Toadvine | Feb. 13, 1951 |
| 2,558,471 | Whitlock | June 26, 1951 |

FOREIGN PATENTS

| | | |
|---|---|---|
| 528,672 | Great Britain | Nov. 4, 1940 |